US010587591B2

(12) United States Patent
Dinia et al.

(10) Patent No.: US 10,587,591 B2
(45) Date of Patent: *Mar. 10, 2020

(54) GENERATING A PASSWORD

(71) Applicant: INTERNATIONAL BUSINESS MACHINES CORPORATION, Armonk, NY (US)

(72) Inventors: Alessandro Dinia, Rome (IT); Riccardo Rossi, Rome (IT); Antonio Secomandi, Milan (IT); Viviana Tripodi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,644

(22) Filed: Nov. 26, 2018

(65) Prior Publication Data
US 2019/0149529 A1 May 16, 2019

Related U.S. Application Data

(63) Continuation of application No. 15/479,092, filed on Apr. 4, 2017, now Pat. No. 10,171,438.

(51) Int. Cl.
H04L 29/06 (2006.01)
H04L 9/32 (2006.01)
H04L 9/06 (2006.01)

(52) U.S. Cl.
CPC ............ H04L 63/06 (2013.01); H04L 9/0643 (2013.01); H04L 9/3226 (2013.01); H04L 9/3239 (2013.01); H04L 63/083 (2013.01)

(58) Field of Classification Search
CPC ...... H04L 63/06; H04L 9/0643; H04L 63/083
See application file for complete search history.

(56) References Cited

U.S. PATENT DOCUMENTS

| 6,470,454 B1 | 10/2002 | Challener et al. |
| 6,735,311 B1 | 5/2004 | Rump et al. |
| 7,461,399 B2 | 12/2008 | Juels et al. |
| 7,861,287 B2 | 12/2010 | Pomerantz |
| 8,024,575 B2 | 9/2011 | Brickell |
| 8,161,534 B2 | 4/2012 | Golle et al. |

(Continued)

OTHER PUBLICATIONS

Babic et al, "Building Robust Authentication Systems With Activity-Based Personal Questions", SafeConfig '09, Nov. 9, 2009, Chicago, Illinois, ACM 978-1-60558-778-3/09/11, 5 pages.

(Continued)

Primary Examiner — Christopher A Revak
(74) Attorney, Agent, or Firm — Jeffrey S. Labaw; Amy J. Pattillo

(57) ABSTRACT

A password service receives user input identifying a particular account and uses a detecting device for detecting an event related to user interaction with a physical location at a predefined time interval. The password service generates questions based on the detected event and selects a set of questions specific for the particular account from among the generated questions. The password service receives further user input comprising one or more received responses to each question of the set of questions and generates a password for the particular account based on the one or more received responses.

20 Claims, 7 Drawing Sheets

(56) References Cited

U.S. PATENT DOCUMENTS

| | | | |
|---|---|---|---|
| 8,219,823 | B2 | 7/2012 | Carter |
| 8,401,522 | B2* | 3/2013 | Crawford ................ G06F 21/31 |
| | | | 455/410 |
| 8,543,554 | B1 | 9/2013 | Singh et al. |
| 9,015,804 | B2 | 4/2015 | Kalgi et al. |
| 9,223,950 | B2 | 12/2015 | Li et al. |
| 9,565,183 | B2* | 2/2017 | Razack ................ H04L 63/083 |
| 9,794,228 | B2* | 10/2017 | Li ........................ G06F 21/31 |
| 9,906,519 | B1* | 2/2018 | Kotamraju ............ H04L 63/083 |
| 10,171,438 | B2* | 1/2019 | Dinia ................... H04L 63/083 |
| 2007/0022300 | A1 | 1/2007 | Eppert et al. |
| 2007/0071200 | A1 | 3/2007 | Brouwer |
| 2007/0214354 | A1 | 9/2007 | Renaud |
| 2008/0216172 | A1 | 9/2008 | Forman et al. |
| 2011/0296509 | A1 | 12/2011 | Todorov |
| 2012/0203663 | A1* | 8/2012 | Sinclair ................. G06F 21/30 |
| | | | 705/26.41 |
| 2014/0047233 | A1* | 2/2014 | Kalin ................... H04L 63/083 |
| | | | 713/155 |
| 2015/0219746 | A1* | 8/2015 | Wiltzius ................. H04W 4/02 |
| | | | 455/456.5 |
| 2016/0099950 | A1 | 4/2016 | Cuff et al. |
| 2017/0078095 | A1 | 3/2017 | Iyer et al. |
| 2017/0264609 | A1* | 9/2017 | Won .................... H04L 63/0876 |
| 2018/0288019 | A1 | 10/2018 | Dinia et al. |
| 2019/0036940 | A1* | 1/2019 | Balakrishnan ........ H04L 63/107 |

OTHER PUBLICATIONS

Albayram et al, "Designing Challege Questions for Location-Based Authentication Systems: A Real-Life Study", Human-Centric Computing and Information Sciences, copyright 2015, 28 pages.

USPTO Non-final Office Action, dated Apr. 19, 2018, U.S. Appl. No. 15/479,092, filed Apr. 4, 2017, In re Dinia, 21 pages.

USPTO Notice of Allowance, dated Sep. 19, 2018, U.S. Appl. No. 15/479,092, filed Apr. 4, 2017, In re Dinia, 5 pages.

"List of IBM Patents or Patent Applications Treated as Related", dated Nov. 27, 2018, 2 pages.

* cited by examiner

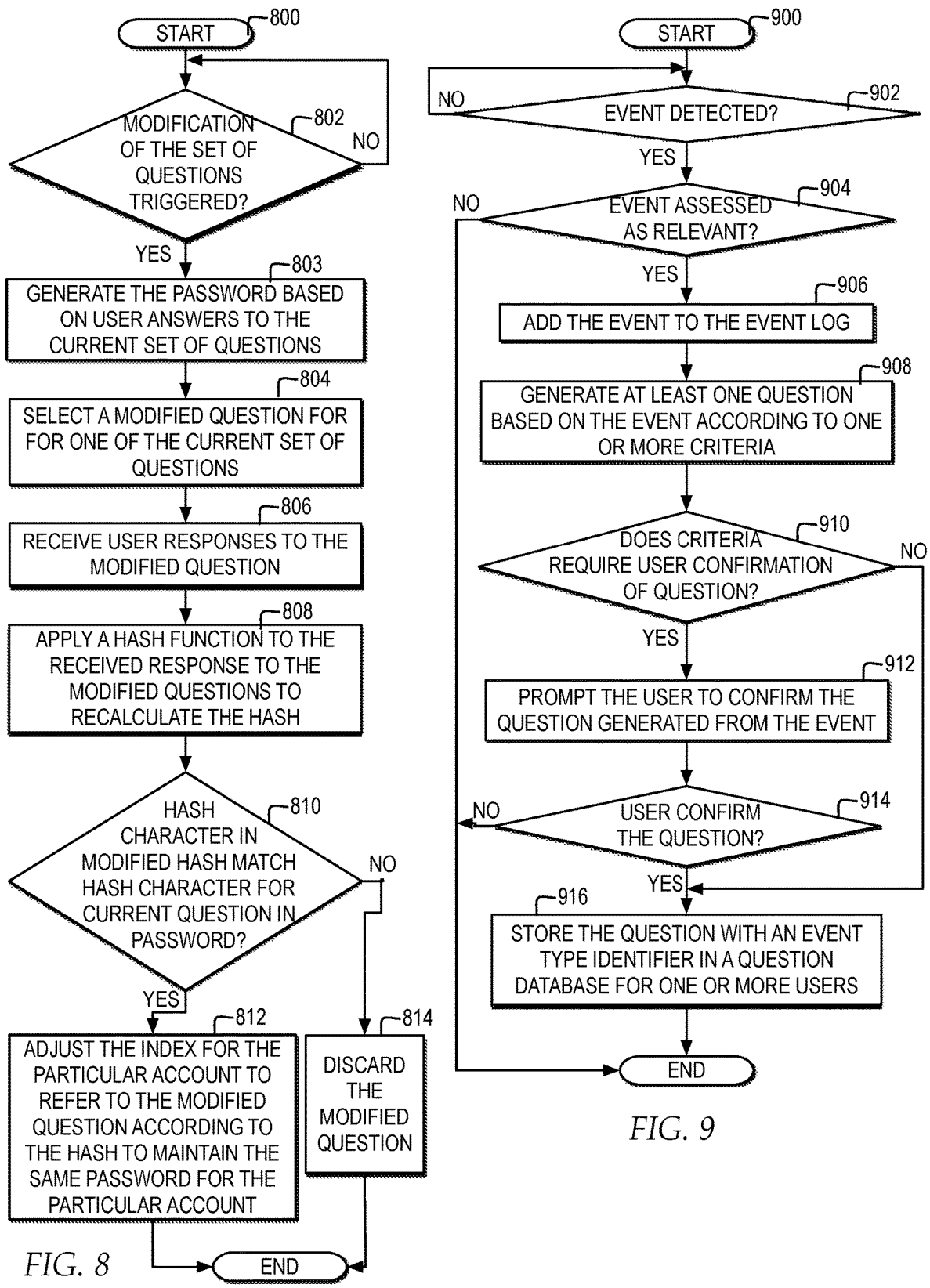

GENERATING A PASSWORD

CROSS REFERENCE TO RELATED APPLICATIONS

This application is a continuation of commonly assigned U.S. patent application Ser. No. 15/479,092, filed Apr. 4, 2017, which is hereby incorporated herein by reference.

BACKGROUND

1. Technical Field

An embodiment of the present invention relates generally to the field of digital computer systems, and more specifically, to generating a password.

2. Description of the Related Art

Devices such as smartphones, tablets and laptops are an integral part of user lives. Information in those devices is often important and needs to be protected. To protect devices and other systems from unwanted intrusions, passwords may be required in order to access the devices. Passwords may need to be complex so that they cannot be retrieved easily, but at the same time the user needs to be able to memorize the password for reentry.

In order to access a system, a user may need to enter a password. In some cases, the user creates the password, which may be a combination of characters or other input options on a keyboard. When a strong password is chosen, user data can be better protected from malicious use.

SUMMARY

In one or more embodiments, a method is directed to receiving, by a computer system, user input from a user for identifying a particular account from among a plurality of accounts. The method is directed to using, by the computer system, a detecting device for detecting an event related to user interaction with a physical location at a predefined time interval. The method is directed to generating, by the computer system, a plurality of questions based on the detected event. The method is directed to selecting, by the computer system, a set of questions specific for the particular account from among the plurality of questions. The method is directed to receiving, by the computer system, further user input comprising one or more received responses to each question of the set of questions. The method is directed to selecting, by the computer system, a portion of characters of only a selection of a plurality of response characters comprising the one or more received responses. The method is directed to generating, by the computer system, a password for the particular account of a string of the portion of characters.

In one or more embodiments a computer program product for generating a password comprises a computer readable storage medium having program instructions embodied therewith. The program instructions are executable by a computer to cause the computer to receive, by a computer, user input from a user for identifying a particular account from among a plurality of accounts. The program instructions are executable by a computer to cause the computer to use, by the computer, a detecting device for detecting an event related to user interaction with a physical location at a predefined time interval. The program instructions are executable by a computer to cause the computer to generate, by the computer, a plurality of questions based on the detected event. The program instructions are executable by a computer to cause the computer to select, by the computer, a set of questions specific for the particular account from among the plurality of questions. The program instructions are executable by a computer to cause the computer to receive, by the computer, further user input comprising one or more received responses to each question of the set of questions. The program instructions are executable by a computer to cause the computer to select, by the computer, a portion of characters of only a selection of a plurality of response characters comprising the one or more received responses. The program instructions are executable by a computer to cause the computer to generate, by the computer, a password for the particular account of a string of the portion of characters.

In one or more embodiments, a computer system for generating a password comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive user input from a user for identifying a particular account from among a plurality of accounts. The stored program instructions comprise program instructions to use a detecting device for detecting an event related to user interaction with a physical location at a predefined time interval. The stored program instructions comprise program instructions to generate a plurality of questions based on the detected event. The stored program instructions comprise program instructions to select a set of questions specific for the particular account from among the plurality of questions. The stored program instructions comprise program instructions to receive further user input comprising one or more received responses to each question of the set of questions. The stored program instructions comprise program instructions to select a portion of characters of only a selection of a plurality of response characters comprising the one or more received responses. The stored program instructions comprise program instructions to generate a password for the particular account of a string of the portion of characters.

BRIEF DESCRIPTION OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 8 illustrates one example of a high-level logic flowchart of a process and computer program for modifying a set of questions for an account; and FIG. 9 illustrates one example of a high-level logic flowchart of a process and computer program for creating questions for users from which a set of questions may be selected for an account.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Embodiments of the present invention may be freely combined with one another.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An advantage of one or more embodiments of the invention is that the user of the account does not have to create or remember complex passwords. An advantage of one or more embodiments the invention is that complex passwords may be dynamically generated leveraging questions related to the user life events in such a way that for the user, and only for the user, it may become easy to generate and use complex passwords without the necessity to either memorize, originate, or write the passwords. In additional or alternate embodiments, some embodiments may not include the advantages of the one or more embodiments and the advantages of the one or more embodiments are not required of all embodiments of the invention.

Figure 1:
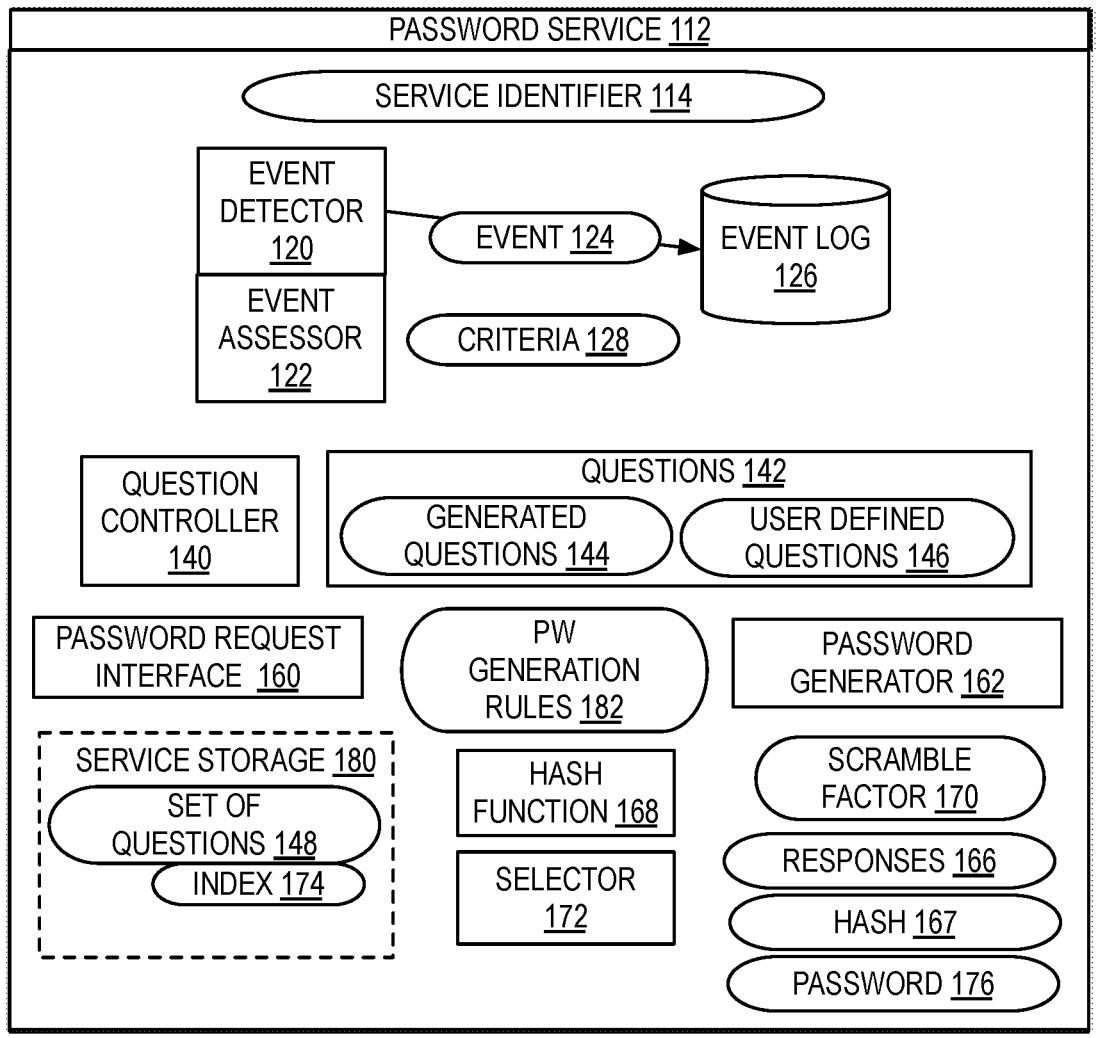
FIG. 1 illustrates a block diagram of one example of a password service for generating and recreating a complex password for a user.

FIG. 1 illustrates a block diagram of one example of a password service for generating and recreating a complex password for a user.

In one example, a password service 112 may be accessible on a computing device. In one example, password service 112 may be secured on a single computing device. In another example, one or more functional components and data of password service 112 are distributed across one or more systems, which may include one or more systems accessible via a network. In another example, password service 112 may be hosted on a server that is accessed by a computing device client via a network.

In one example, password service 112 may provide a service for a user. In one example, a user may refer to an entity such as, but not limited to, an individual, a computer, or an application executing on a computer or on a device. In one example, password service 112 may be set to provide a service for a particular user identified in service identifier 114. In one example, the user identified in service identifier 114 may register for service with password service 112. In another example, the user may register one or more types of account identifiers in service identifier 114. For example, the user may register or authorize one or more types of accounts to be monitored by password service 112 in service identifier 114. In one example, an "account" may refer to a certain part of computing's resources (or computing accessing structure) that is allocated to a specific user or a specific group of users. An account may include, but is not limited to, messaging account, e-mail account, Internet Service Provider (ISP) account, web sites account, social networking account, or other type of computer access account structures. Service identifier 114 may include one or more types of identification data for identifying a user, identifying one or more accounts, and identifying user preferences for the management of password service 112.

In one example, password service 112 may include an event detector 120. In one example, event detector 120 may detect one or more events, such as an event 124, related to the user identified in service identifier 114. In one example, an "Event", such as event 124, for example, may refer to an occurrence of one or more activities that may occur using one or more computing devices of the user of an account. For example, during every day life a user may perform check-ins through a computing device in one or more locations, such as restaurants and cinemas, through one or more account interfaces. Event detector 120 may detect and store data indicating these check-in events in an event log 126. For example, event log 126 may be created for recording various events relating to the user and the computing device uses by the user. Event detector 120 may log each event in event log 126 by date, time and location where the event is occurred.

In one example, prior to storing the data indicating a check-in event as an event 124, event assessor 122 may evaluate whether each check-in event qualifies as a significant event and select to store in event log 126 only those events evaluated as significant events. In one example, event assessor 122 may evaluate whether an event qualifies as a significant event based on one or more rules specified in criteria 128. In one example, criteria 128 may specify that a significant event may include, but is not limited to, an event that occurs at a frequency smaller than a predefined maximum frequency or if the place of the check-in or in general the event is distinguishable in some way from the general habits of the user.

In one example, password service 112 may also collect and store questions 142 for a user. In one example, questions 142 may include, but are not limited to, user defined questions, such as user defined questions 144, or automatically generated questions, such as generated questions 142 that are automatically generated by a question controller 140. The term "question", such as in questions 142, may refer to a request for information or a prompt to the user to obtain information. The obtained information may comprise one or more possible answers to the question, which may or may not be correct. In one example, the question may be defined as an interrogative sentence, or text string, that may be identified by, for example, the presence of a question mark at the end and/or the presence of an interrogative word such as "who", "what", "when", "where", and "why" at the beginning of the sentence. In another example, the question may be a "fill-in-the-blank" style question. The question may be provided as a text message, audio message or video message.

In one example, in response to event detector 120 adding event 124 to event log 126, question controller 140 may then automatically generate a question by, for example, asking a user to confirm or delete an event. For example, question controller 140 may, for example, control a display of event 124, control a display of one or more entries of event log 126, or control a display of a mixed entry that is generated from different entries of event log 126, and request that the user confirm the question about the event, with the question and response recorded in generated questions 144, or select to delete the question. In one example, the mixed entry may comprise the date of a first entry and location of another entry from event log 126. In one example, a user may select to delete questions if the answers to the questions may be difficult for the user to remember consistently or if the question is one that others may easily know the answer to. In another example, question controller 140 may control display of event log 126 and the user may provide or input questions related to the logged events, which are stored as user defined questions 144. In addition, question controller 140 may prompt a user with an event from event log 126 and ask the user to generate a question for the event and store the response in user defined questions 146. In one example, questions 142 may be provided by the user and other users and stored at the computing device on which password service 112 is executed.

According to one embodiment, a collection mode for collecting questions 142 may include, but is not limited to, using event detector 120 for detecting an event at a predefined time interval, and question controller 140 generating a question based on the detected event. In one example, event detector 120 may include one or more types of detecting devices including, but not limited to, a Global Positioning System (GPS) receiver, near field communication (NFC) technology, an accelerometer or a gyroscope, camera, navigation application, wireless local area networking (Wi-Fi) card, and a Bluetooth card. For example, event detector 120 may retrieve event data from a camera for question controller 140 to use to generate questions based on the content, such as a question of "how long have you been watching a game that was filmed by the camera?". For example, event detector 120 may retrieve event data from navigation application usage for question controller 140 to use to generate questions based on the navigation, such as a question of "which cities did you travel to today?" In one example, the event data retrieved by event detector 120 from a Bluetooth card may indicate the location of the user, such as indicating the user is in a car, for a particular time period. Event detector 120 may detect event data from an NFC tag or NFC controller that enables the NFC technology, where for example the event data may include data related to NFC payments made by the user using an NFC tag.

Event detector 120 may, for example, enable question controller 140 to automatically generate questions, such as generated questions 144. Question controller 140 may automatically generate generated questions 144 based on events 124 detected the by event detector 120 and based on multiple events logged in event log 126. For example, question controller 140 may automatically generate a question by listing the locations that the user has visited over a particular time period, such as the last 10 days as tracked in event log 126, and asking the user to select the last visited location among the listed locations. In another example, question controller 140 may automatically generate a question based on the time spent by the user connected to a given Wi-Fi network as tracked in event log 126. In one example, question controller 140 may generate questions based on templates, such as "How long have you been connected to Wi-Fi $X on $date" or "which Wi-Fi network have you accessed on $date". In another example, question controller 140 may generate questions based on other types of rules or formulas. In one example, question controller 140 may extrapolate from context elements in event log 126 one or more pertinent questions and store the questions as generated questions 144.

In one example, events, such as event 124, event log 126, and questions 142 may be stored in a single computing device or distributed across multiple devices and may be shared across devices. For example, multiple devices may detect events and record events locally in an event log at the device or share the events to an event log in a single location. In addition, for example, events, event log 126, and questions 142 may be pushed or pulled to multiple devices and locations. The use of multiple devices to collect event log 126 and questions 142 may increase the security of password generation by password service 112 because the data used to generate questions 142 are not held on a single device and the questions themselves are generated based on events sourced from multiple events detected at multiple devices. Even if a third party is monitoring events with a third party service on a particular device that is used by a user, if password service 112 accesses events generated from different devices to generate questions 142, the third party service would only have access to a portion of the events that are accessed by password service 112 to generate questions 142.

In one example, when the user needs to set a new password, the user may request to generate a new one via password service 112 by selecting an input to trigger password request interface 160. The term "password" as used herein may be a word or string of characters used for user authentication to prove identity or access approval to gain access to a resource such as an account (e.g. an access code is a type of password), which is to be kept secret from those not allowed to access the resource. The password may encompass a passcode, passphrase and other arrangements of multiple characters or other information utilized in authentication.

In response to the user selecting an input to trigger password request interface 160, a password generator 162 of password service 112 may prompt the user with a set of questions 148. In one example, password request interface 160 selects set of questions 148 from among generation questions 142 and user-defined questions 144. In one example, each question is related to a different event in event log 126. In additional or alternate embodiments, when password generator 162 is triggered, first, password generator 162 may trigger questions controller 140 to gather or update event log 126 from one or more devices and generate or update questions 142, prior to password generator 162 selecting set of questions 148. In additional or alternate embodiments, password request interface 160 may select the questions in set of questions 148 from one or more additional or alternate sources.

In one example, password generator 162 may determine a level of protection required for an account that requires a password and calculate a number of questions from set of questions 148 to provide the level of protection required. In one example, the higher the level of protection required, the greater number of questions selected by password generator 162 from set of questions 148. Password generator 162 may dynamically configure or control the number of questions selected from set of questions 148 based on one or more factors indicative of the level of protection required. For example, for the same account, the level of protection varies depending on the location of the user and/or depending on the time for accessing the account. In one example, password (PW) generation rules 182 may specify rules for dynamically selecting a number of questions for set of questions 148 for a particular account. In the example, if the user is located in a public area, the level of protection may be higher than if the user is outside a public area, as it may prevent a third party from recording the questions.

In one example, password generator 162 may select different selections of questions from among questions 142 for set of questions 148 for different accounts that password generator 162 is requested to generate a password for. In one example, password request interface 160 may detect, from an interface of an account requiring a password, a number of characters, types of characters, and other details of the password requirement, and select the number and type of questions from questions 142 for set of questions 148 by account.

In one example, the user responses to the questions in set of questions 148 are illustrated as responses 166. Password generator 162 may output set of questions 148 in one or more output interfaces, including, but not limited to, a graphical user interface and an audio interface. In one example, the selected set may be output concurrently in one interface or may be output sequentially, where a single question from a set is output and upon receipt of an answer to the question, a next question from a set is output. A user may respond to the output of set of questions 148 with inputs illustrated as responses 166, concurrently in the interface or sequentially as each question is output. In one example, a user may select one or more input interfaces for responding to the questions, as responses 166, such as a selection within a graphical user interface, and a verbal response recorded by a microphone. A user response may include one or more forms, including, but not limited to, digital text, a voice, and a video message and may be transformed into strings in responses 166. Each response in responses 166 may comprise a sequence of one or more strings and one or more numbers.

In one example, in addition responding to the output of set of questions 148, a user may also select to replace or reject one or more of the questions. In the example where a user selects to replace or reject one or more questions, password generator 162 may select an alternative question from among questions 142 to the rejected question and output the alternative question, such that the user may provide a response to the alternative question. In one example, the user may be allowed to reject original questions and alternative questions output to the user a maximum number of times. In one example, question controller 140 may automatically generate the one or more alternative questions for each question in set of questions 148. In another example, question controller 140 may prompt a user to input alternative questions as user defined questions 146. In yet another example, question controller 140 may determine alternate questions by asking the user a new question and a previously stored question from questions 142, the answers to the two questions are hashed, and the result compared to determine if there are matches in predefined positions of the two answers. If the hashed result matches the expected answer, then the new question is stored as an alternative question to the previously stored question in questions 142.

In response to the user answering one or more of the questions in set of questions 148, illustrated as responses 166, password generator 162 of password service 112 may generate a new different and longer string for each answer in responses 166 and, from the resulting string, password generator 162 uses one or more characters to form the complex password, illustrated as password 176. In one example, PW generation rules 182 may specify one or more rules for selecting which characters to string together to form the complex password. In one example, while password service 112 may store set of questions 148 in service storage 180 for use in recreating a password, password service 112 may only temporarily cache each of responses 166 and password 176 in a secure layer and delete the data from memory in response to one or more events, such as a user indicating password 176 is accessed or a period of time passing after password 176 is displayed. In one example, service storage 180 may represent memory and storage on a single device hosting password service 112 or distributed across multiple devices. In one example, questions 142 may also be stored in service storage 180 on a single device or distributed across multiple devices.

In one example, in prompting a user to answer set of questions 148, password generator 162 may require that the user provide inputs for responses 166 within a predefined time limit. Password generator 162 may also dynamically select a time limited based on the security level of protection required for a password. By requiring the user to answer set of questions 148 within a particular time period after the user is prompted with each question, additional security may be provided since password generator 162 will only generate a password if responses 166 are received in a prompt manner within the particular time period. In one example, by requiring prompt responses, third parties who do not know the expected responses would have limited time to search for data about a user to respond with as responses 166.

In one example, by event detector 120 recording events indicative of the user activity of a particular user in event log 126 and question controller 140 prompting the user to confirm questions about the event or enter a user defined question about logged events, password service 112 dynamically generates and stores a selection of questions 142 that are unique to the particular user and relevant to the user's specific experiences. In one example, some applications that require a user to enter password may include a set of pre-selected questions for all users to provide answers to, such that if a particular user forgets the user's password and needs to set a new password, the application asks the user to answer the pre-selected questions and determines whether the user provides answers that match the previous answers before allowing the user to reset a password. Password service 112, in contrast, dynamically generates and stores a selection of questions 142 that are unique to the particular user based on detected user events and password service 112 uses the responses to the questions to generate the digits of the unique, complex password. Password service 112 first generates the questions to be answered by a particular user in order to then generate a complex password based on the user's answers.

When the user needs to access a particular system or to unlock a device that requires the password that was previously generated by password generator 162, if the user does not recall the password, the user may select an input to trigger password request interface 160 to request that password 112 recreate the password. The user may be asked the same questions in set of questions 148 and password generator 162 may apply the responses to those questions to recreate a complex password. In the example, password generator 162 only recreates the complex password matching the previously generated password if the user provides the same responses to the questions in set of questions 148 that the user previously provided to the same set of questions 148. In one example, password service 112 may select to store questions 142, but not to store responses 166 to set of questions 148 or password 176 generated by password generator 162, to minimize the data storage requirements for password service 112 and to minimize compromises to the security of the password by not storing any data that would allow a malicious user unauthorized access to the password itself or to recreate the password.

In one example, password generator 162 may generate password 176 based on predefined algorithms and password complexity may meet a user-defined policy. For example, password generator 162 may generate password 176 by a concatenation of responses 166. In another example, password generator 162 may generate password 176 by performing hashes of responses 166, which may be further scrambled and padded according to predefined algorithms and user defined policies in PW generation rules 182.

In one example, password generator 162 may generate a password by determining a hash 167 by applying a hash function 168 to received responses 166, wherein password 176 comprises at least part of hash 167. Each response of the received responses 166 may for example be a string of a sequence of characters.

In one example, hash 167 may be determined per response in responses 166, resulting in a set of hashes. In another example, hash 167 may be determined for a predefined number of responses from among responses 166. For example, if the number of responses in responses 166 is 10, hash 167 may be generated for each 2 responses, where 2 is the predefined number in PW generation rules 182.

In one example, hash function 168 as used herein may be a function that can be used to map data of arbitrary size to data of fixed size. The values returned by hash function 168 are called hash values, hash codes, hash sums, or hashes. In one example, an example of hash function 168 may comprise a cryptographic hash function.

In one example, password generator 162 may use the one or more hashes determined in hash 167 to generate or calculate password 176. In one example, password 176 may be defined as a concatenation of the determined hashes in hash 167. In one example, PW generation rules 182 may specify one or more rules for dynamically concatenating the hashes to form password 176. In one example, concatenating the determined hashes in hash 167 may be advantageous as it may provide a simplified and secure method for generating a password. In additional or alternate embodiments, some embodiments may not include the advantages of the one or more embodiments and the advantages of the one or more embodiments are not required of all embodiments of the invention.

In another example, password generator 162 may generate password 176 from a predefined part of the hashes in hash 167, where the predefined part of the hashes is selected according to one or more rules in PW generation rules 182. In one example, the predefined part of the hashes in hash 167 may comprise the hash of the first received response in responses 166 and the hash of last received response in responses 166. In another example, the predefined part of hashes may comprise hashes of responses in responses 166 that are received in a time interval smaller than a predefined maximum time response. At time t0, the question may be provided to the user of the account and at time t1 the response is received. If the time interval t1–t0 is smaller than the predefined maximum time response (e.g. 5 min), this may be an indication that the user who provides the responses is the owner of the account. A password that is generated by password generator from these responses may be difficult to reproduce as the password is generated based on a combination of two constraints including the time and responses to questions.

In one example, password generator 162 may leverage hash function 168 with scramble factor 170, such that each hash of a response may be scrambled and padded and a small subset of characters of the hash (e.g. scrambled and padded hash) are selected to be used to form the new password. The longer the response is in responses 166 and the longer the padding is in scramble factor 170, leads to a higher number of characters that may be selected for password 176. Different words may lead to different scramble results. In one example, scramble factor 170 may be set to a static value. In another example, PW generation rules 182 may dynamically select the value of scramble factor 170 for a particular account according to one or more factors.

One or more embodiments of the present invention may further increase the secure aspect of the password generation method. According to one embodiment, password generator 162 generating password 176 may include selector 172 selecting at least one character from hash 167 as a character of password 176 according to one or more rules in password generation rules 182 and generating an index 174 of the selected character to be stored with the account. Index 174 provides a quicker search for characters forming the password compared with a direct search.

In one example, index 174 may be stored with set of questions 148 in service storage 180 on a computing device in association with a particular account. To recreate the password, index 174 may be read with set of questions 148 from where it is stored in order to find the references or positions associated to a given question. The positions associated with the given question may be used to find or identify characters in the hash of the response of the given question. The found characters of the set of questions may be used for generating the password.

The term "index", such as index 174, may refer to data having a data structure to identify a character included in a hash of each response of the received responses. An index may for example be a data structure such as an array that stores a pointer or indication or reference that identifies an element of the hash of a response that may be used for generating the password. The structure of the index may be determined using password generation rules. For example, the index may refer to characters number 1 and 3 of the hash of the first response and may refer to the last character of the hash of the second response.

In one example, a single response in responses 166 may be used to generate a single character of password 176, which provides a robust solution for generating a random, secure password. In another example, a set of questions smaller than one question may be used for each character. This may provide a simplified method for generating the password. For example, for generating a password of N characters, password generator 162 may select N different questions in set of questions 148 from among questions 142 so that the answer to each question is used to retrieve one of the N characters of the password (one question to determine one character from the associated answer). In another example, password generator 162 may select N/2 questions in set of questions 148 and from each question 2 characters of password 176 are determined. In a further example, password generator 162 may generate the N characters of the password from a response of a single question in set of questions 148.

In one example, password generator 162 may select to modify set of questions 148, recalculate hash 167, and adjust index 174, such that the resulting password remains the same. For example, set of questions 148 may be replaced by alternative questions that are stored and associated with the account. In one example, password generator 162 may dynamically or periodically modify set of questions 148, recalculate hash 167 and adjust index 174 to increase the security of the generated password by securing and replacing the data in service storage 180.

In one example, modifying set of questions 148 may include multiple types of modifications including, but not limited to, reformulating set of questions 148 in a different language. The user of the account may speak different languages. Set of questions 148 may be formulated in one or more languages of the user. Modifying the set of questions may comprise replacing the set of questions by corresponding set of questions formulated in a different language. This may add further constraints and may thus further increase the secure aspect of the password generation.

In one example, one or more embodiments of the present invention may have an advantage that by generating and recreating passwords for a user via password service 112, the user does not need to memorize a password, which allows the possibility to exploit more secure passwords both in terms of length and complexity. In addition, one or more embodiments of the present invention may have an advantage that by generating and recreating passwords for a user via password service 112, the user does not need to write passwords down to remember the password, which provides a more secure system overall. In additional or alternate embodiments, some embodiments may not include the advantages of the one or more embodiments and the advantages of the one or more embodiments are not required of all embodiments of the invention.

In one example, one or more embodiments of the present invention may have an advantage that by providing a password generation and recreation service via password service 112 based on the activity and experience of the single user registered in user identifier 114, the passwords provided by password service 112 may be very secure as the service is specified by user and variegated, and therefore difficult to be stolen or misappropriated. In additional or alternate embodiments, some embodiments may not include the advantages of the one or more embodiments and the advantages of the one or more embodiments are not required of all embodiments of the invention.

In one example, one or more embodiments of the present invention may have an advantage that password service 112 may only store event log 126 and set of questions 148, however password service 112 is not required to save password 176 or responses 166 to set of questions 148, which minimizes the amount and types of data stored by password service 112 and makes the overall system more robust because the generated password and the responses to the set of questions are not accessible from password service 112 if an unauthorized entity gains access to password service 112. In additional or alternate embodiments, some embodiments may not include the advantages of the one or more embodiments and the advantages of the one or more embodiments are not required of all embodiments of the invention.

In one example, one or more embodiments of the present invention may have an advantage that password generator 162 may dynamically determine set of questions 148 and set of questions 148 may be user specific, in contrast to an example where the password questions used by an application are fixed for all the users of the application or where the password questions and responses are stored as a method for a user to access an account if the user forgets the password. In additional or alternate embodiments, some embodiments may not include the advantages of the one or more embodiments and the advantages of the one or more embodiments are not required of all embodiments of the invention.

In one example, one or more embodiments of the present invention may have an advantage that password service 112 may be more secure than a password vault application that stores passwords for a user because password service 112 may not require using a password vault because each password may be recreated by replying to a set of questions and does not need to be stored. In additional or alternate embodiments, some embodiments may not include the advantages of the one or more embodiments and the advantages of the one or more embodiments are not required of all embodiments of the invention.

In one example, one or more embodiments of the present invention may have an advantage that the security of password generation is increased and improved by dynamically generating set of questions 148, which includes one or more questions that are not easily predictable. In particular, questions 142, from which set of questions 148 is generated, may include questions that are based on the experience of a particular user and that are defined by a particular user, which provides an additional layer of security in that the lack of predictability of the questions may increase the difficulty for a malicious user to search for or guess answers to the questions.

Figure 2:
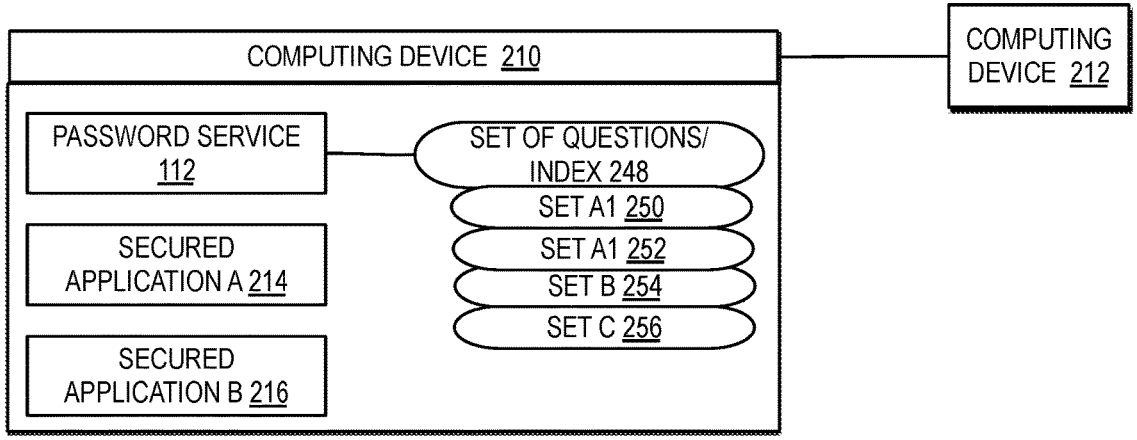
FIG. 2 illustrates a block diagram of one example of a computing device for implementing a password service for generating one or more complex passwords for one or more secured applications.

FIG. 2 illustrates a block diagram of one example of a computing device for implementing a password service for generating one or more complex passwords for one or more secured applications.

In one example, a computing device 210 may include an instance of password service 112 resident on computing device 210 or accessible to computing device 210 through a network. In one example, computing device 210 includes multiple secured applications, such as secured application A 214 and secured application B 216. In one example, each of secured application A 214 and secured application B 216 require a user to enter at least one password to access at least one account. For example, secured application A 214 may represent a browser application through which a user may access multiple websites that each include a separate requirement for the user to enter a separate password to access a separate account. In another example, secured application B 216 may represent a specific application through which a user may access a particular service, where the user is required to enter a single password to access an account for the particular service.

The term "computing device", such as computing device 210, may refer to a device with computing capability that is able to transmit or access data from a computing arrangement. A computing device includes both portable computing devices and non-portable computing devices. A portable computing device is generally a device that can operate on a battery and transmit and receive data wirelessly. Examples of a portable computing device may include, but are not limited to, a laptop computer, a tablet computer, a personal digital assistant, and a smart phone. An example of a non-portable computing device is a desktop computer.

In one example, password request interface 160 of password service 112 may include one or more types of interfaces through which a user may select to generate a password and specify the account to associate with the password. In one example, the account may be identified by an account identifier for one or more types of accounts including, but not limited to a messaging account, computer account, e-mail account, web sites account or a social networking account etc. using the name of the messaging service, computer or social networking. In one example, an account identifier may include, but is not limited to, a user login name or user account name.

In one example, password request interface 160 of password service 112 may include an interface through which a user may manually select to generate a password. In one example, password request interface 160 may cause computing device 210 to display a graphical user interface on an output interface of the computing device, where the graphical user interface includes a selectable option for a user to select and input fields for a user to enter an input to select to generate a password and to select the account to associate with the password. In one example, the graphical user interface for password request interface 160 may be displayed as a stand-alone interface within the display, where a user may select to generate a password and the user may select which account to associate with the password. In another example, the graphical user interface for password request interface 160 may plug-in to one or more of secured application A 214 and secured application B 216, where the user may select to generate a password through password request interface 160 through a selectable options or inputs displayed within an interface for the secured application.

In another example, password request interface 160 may include an interface through which a user may specify options that will automatically trigger a user request to generate a password. For example, a user may specify a request for password request interface 160 to automatically trigger a user request to generate a password on a predefined periodic basis, such as every day or every week. In another example, a user specify a request for password request interface 160 to automatically trigger a user request to generate a password in response to detecting a particular condition or event.

In another example, where the user is another computing device, such as computing device 212, or another application, such as secured application A 214, that may require generation of a password for another user of the another computing device or for another user of another application, password request interface 160 may provide an interface through which another computing device or another application may enter an input of a command or interface call to request generation of a password by calling password request interface 160. For example, computing device 212 may call password request interface 160 on computing device 210 through a network interface. Enabling an application or another computing device to call password request interface 160 on computing device 210 may be advantageous, for example, as it may provide a centralized system and method that may provide passwords for multiple users using other devices that may connect to computing device 210.

In one example, where password service 112 receives requests for generating password for multiple, different accounts, password generator 162 may select a different set of questions for each of the accounts and also generate an ordered index of the questions and the particular character positions within the hash responses to the questions. For example, as illustrated in FIG. 2, set of questions 148 may include a set A1 250 of a particular selection of questions and an index that is generated for a first account accessible via secured application A 214 and a set A2 252 of a particular selection of questions and an index that is generated for a second account accessible via secured application A 214, where each of set A1 250 and set A2 252 are associated with different accounts. In addition, set of questions 148 may include a set B 254 of a particular selection of questions and an index that is associated with an account accessible via secured application B 216. In addition, set of questions 148 may include a set C 256 of a particular of questions and an index that is associated with another computing device, such as computing device 212, that accesses computing device 210, such as via a network connection.

In one example, password generator 162 may automatically select a separate subset of questions 142 for each of the sets in sets of questions 148, each specified for a different account, from among questions 142 that are stored or pulled by question controller 140 for selection by password generator 162. In one example, one or more of the stored questions in questions 142 may be associated with a single user or with multiple users. Password generator 162 may, randomly or according to one or more rules, select the particular questions from among questions 142 to include in a set of questions for a particular account based on the account identifier, for example. In one example, password generator 162 may store the particular question in a set of questions in the index, referring to question identifiers within questions 142.

In another example, password service 112 may output questions 142 to a user, whether through a display interface of computing device 210 or another interface, and the user may select one or more questions from among questions 142 to be specified as a set under set of questions 148, for a particular application. In one example, output of questions 142 may include, but is not limited to, output of the full questions, output of a separate number assigned to each question, and output of other separate indicators of each question.

In one example, each of the sets stored under set of questions 148 may be stored as digital text, audio or audiovisual files on computing device 210, such that the stored questions can be processed by computing device 210 from local storage. In additional or alternate embodiments, one or more of the sets under set of questions 148 may be distributed across multiple computing devices, such as distributed across computing device 210 and computing device 212.

In one example, password service 112 generates a password for accessing secured application A 214 or secured application B 216 in response to a user request to generate a new password. In another example, password service 112 is triggered to generate a password when processing user responses to password requests. For example, if set B 254 is specified for secured application B 216 as the questions for a user to answer to generate password to access an account associated with secured application B 216, then password service 112 may access the same set B 254 and present the questions in set B 254 to the user to answer each time the user may need the password in order to access the account associated with secured application B 216. In this way, the user does not have to save the password because password service 112 recreates the password from the user's answers to the questions in set B 254, and only recreates the same password each time if the user answers the same responses each time to the questions in set B 254.

Figure 3:
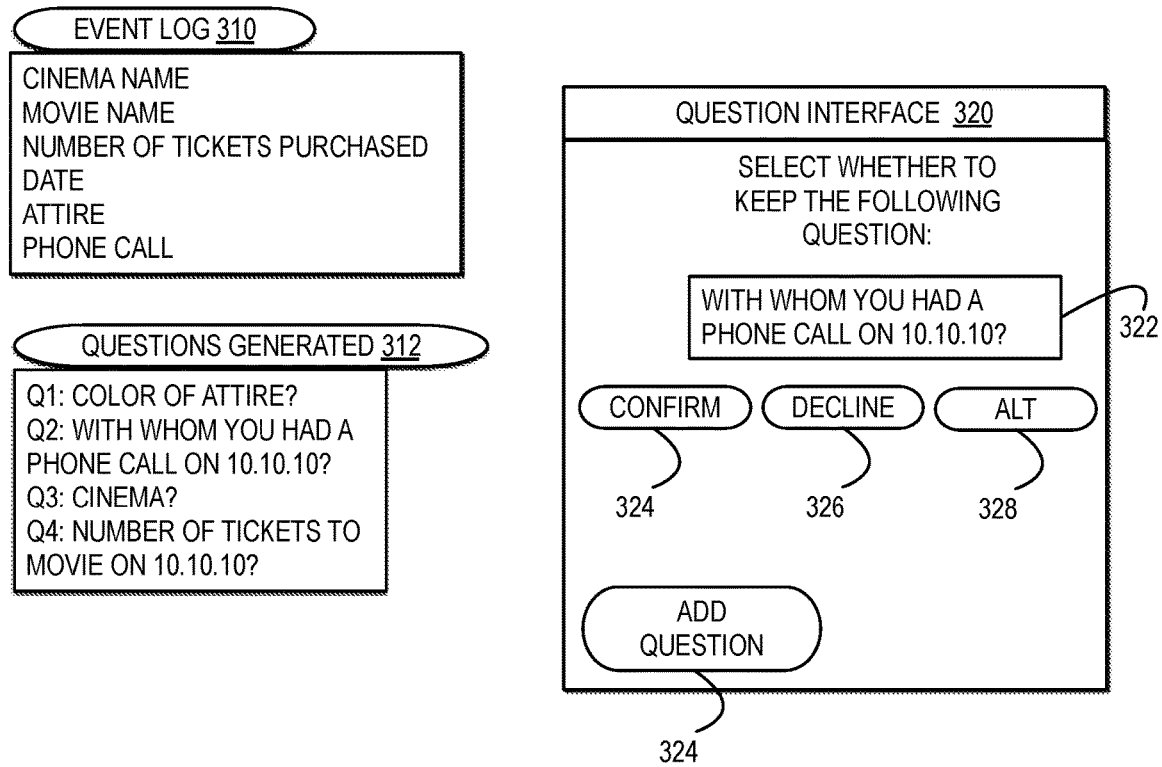
FIG. 3 illustrates a block diagram of one example of an event log, generated questions, and an interface for prompting a user to add or confirm, decline, or modify a generated question.

FIG. 3 depicts a block diagram of one example of an event log, generated questions, and an interface for prompting a user to add or confirm, decline or select an alternative question. In one example, an event log 310 illustrates one example of events detected by one or more event detectors, such as event detector 120, and added to an event log 310 of password service 112. For example, a user may go to a cinema to see a movie. At the cinema, the user may purchase tickets with the user's smartphone, via a payment to an NFC payment system. An event detector on the user's smartphone may detect the user's location at the cinema and the event detector of the NFC payment system may detect the event of a user purchasing one or more movie tickets. Based on the events detected by the event detectors, event log 310 may be updated with one or more events based on the detected location and ticket purchase, such as, but not limited to, "cinema name", "movie name", "number of tickets purchased", and "date". In addition, an event detector on the user's smartphone may detect that the user receives and takes a call while waiting to see the movie and update event log with "phone call".

In one example, based on event log 310, question controller 140 may prompt a user with a question interface 320. In one example, question interface 320 may include a selection option to add question 324. In one example, a user may select add question 324 and select to add a question of "color of attire?", as illustrated in questions generated 312. In another example, question controller 140 may automatically generate a question such as "color of attire", where a user is prompted to answer a question about the color of attire at a particular event.

In addition, within question interface 320, question controller 140 may prompt a user to select whether to keep a question generated by question controller 140 based on one or more events in event log 310. For example, question interface 320 includes a question 322 of "with whom you had a phone call on 10.10.10" that is based on the logged events of "date" and "phone call" in event log 310. In one example, within question interface 320, a user may select a selectable option of confirm 324 to select to confirm and store the question in questions generated 312. In another example, within question interface 320, a user may select a selectable option of decline 326 to select to decline to keep a question, where if the user selects the option, the question is removed from questions generated 312. In another example, within question interface 320, a user may also select a selectable option of alternate (ALT) 328 to select an alternate question to be asked instead of the question presented or to select to replace a current question.

Figure 4A:
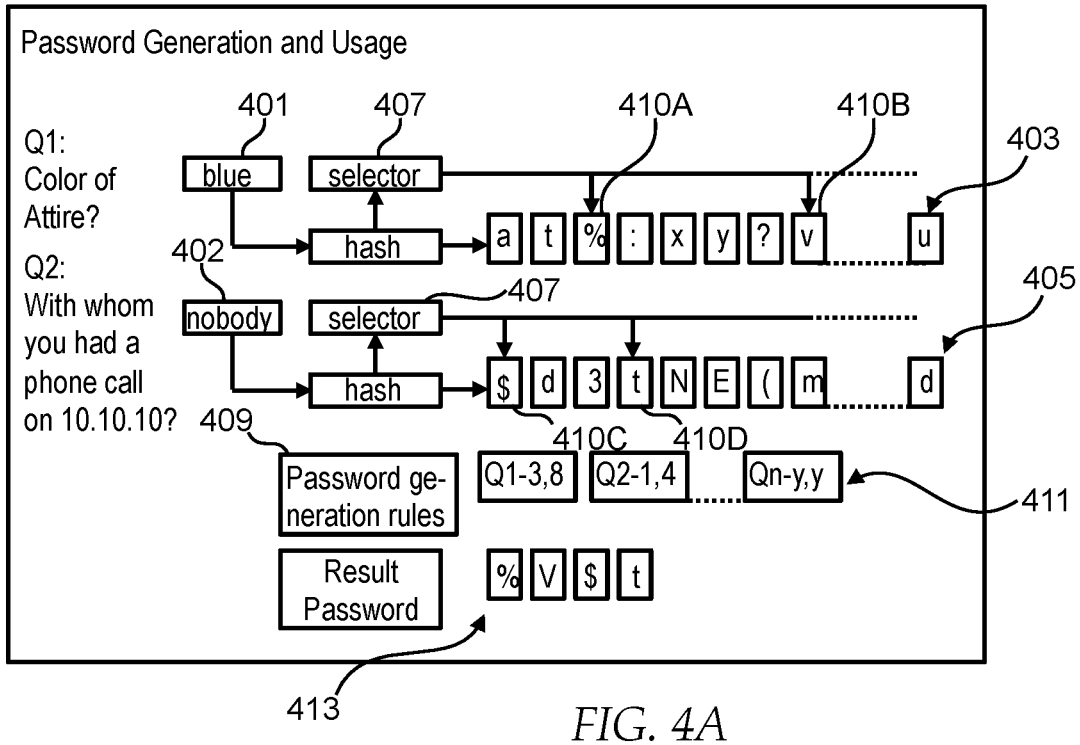
FIGS. 4A-4B illustrate block diagrams of one example of application of a password service generating a password.

FIG. 4A depicts a block diagram illustrating one example of an application of a password service for generating a complex password.

In the example of FIG. 4A, two questions Q1 and Q2 represent the set of questions to be answered by a user, in response to a user request to create or enter a password. Question controller 140 may generate questions Q1-Q2 after a certain number of events occur that collect sufficient information to elaborate a password. In one example, once question controller 140 identifies that a sufficient number of questions have been generated in questions 142, password request interface 160 may notify a user, through an interface, that password generation may be possible through password service 112.

In one example, question Q1 requires a color of attire to be specified, as illustrated by "color of attire?", and Q2 requires an answer to a question of "with whom you had a phone call on 10.10.10?". In the example, the computing device implementing password service 112 may be a mobile phone that registers a set of contacts of the user of the account, where the user's response to Q2 may indicates one of the contacts. In particular, in the example, a response 401 is illustrated, of a user response to question Q1, and a response 402 is illustrated, of a user response to question Q2.

In one example, hash function 168 generates a hash 403 from response 401 of "blue". In addition, hash function 168 generates a hash 405 from response 402 of "nobody". Each of hash 403 and hash 405 are illustrated by separate sequences of characters.

In one example, selector 407, such as selector 172, may select the characters of each of hash 403 and hash 405 that may be used for generating the password. In one example, selector 407 may select the characters based on password generation rules 409. Password generation rules 409 may, for example, be represented by an index 411 that refers to the characters to be selected from each response to the set of questions Q1 and Q2. As shown in FIG. 4A, index 411 includes a value "Q1-3, 8" which refers to character 410A, the third character of hash 403, and character 410B, the eighth character of hash 403. In addition, as illustrated in FIG. 4A, index 411 includes "Q2: 1, 4", which refers to character 410C, the first character of hash 405, and character 410D, the fourth character of hash 405. Index 411 may further indicate, as shown in FIG. 4A, the characters corresponding to further questions, as illustrated by "Qn-y,y" that may be used in another set of questions. While the example shown in FIG. 4A uses questions Q1 and Q2 as forming the set of questions to be answered, in additional or alternate examples, the set of questions may include additional or alternate questions to Q1 and Q2.

In the example, password generator 162 generates a result password 413. In one example, password generator 162 forms result password 413 from a sequence of characters 410A, 410B, 410C, and 410D, by concatenating the characters of 410A, 410B, 410C, and 410D. Result password 413 illustrated in FIG. 4A may be based on answers 401 and 402, which may be referred to as "correct" or default answers.

In the example, the set of questions Q1 and Q2 and index 411 associated with the questions, are stored in association with a particular account. In the example, responses to the stored questions, illustrated as response 401 and response 402, and the passwords, illustrated as result password 413, are not stored. In this way the data entered by the user that may be used to recreate the password may not be stored. For example, the questions are stored, and for each managed password, the list of questions and the index into what portion of the hashed/scrambled result is to be used, are stored, but the responses to the questions are not stored.

Figure 4B:
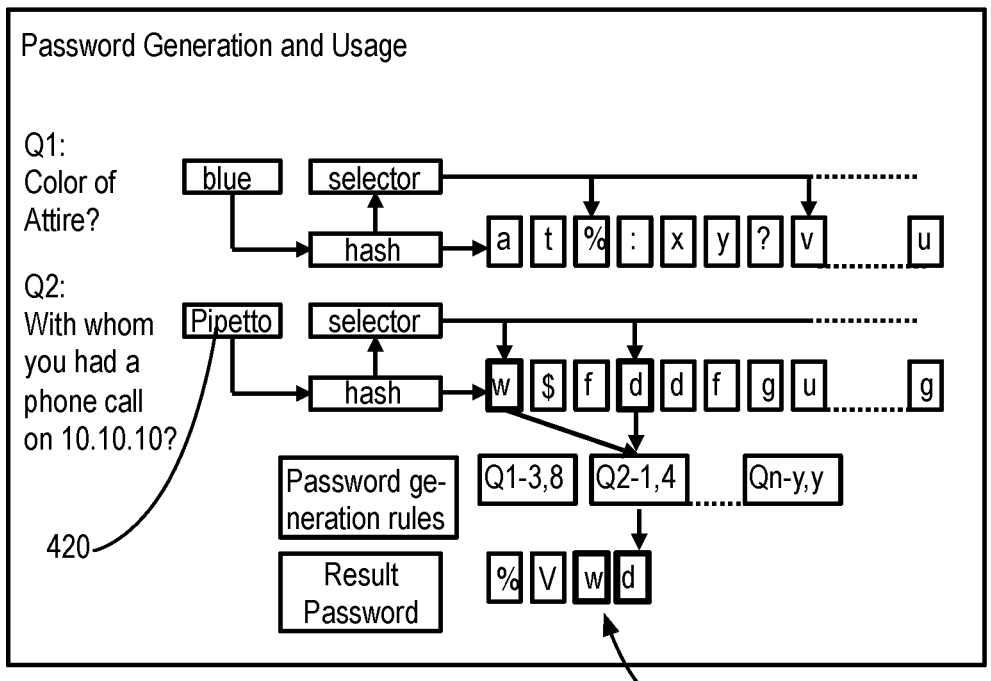

In the example, FIG. 4B illustrates an example of password service 112 being triggered to recreate the password generated in FIG. 4A, but the user entering an incorrect answer to a question, where the incorrect answer is an answer that does not match the answer previously provided to the question. If the user enters an incorrect answer to a question, as illustrated in FIG. 4B, the password generated by password service 112 does not match the previously generated password. For example, in FIG. 4B, the user's response to Q2, as illustrated at reference numeral 420, is "Pipetto", but the "correct" answer to Q2 is "nobody", as illustrated by response 402 in FIG. 4A. In FIG. 4B, because the answer to Q2 is incorrect, a result password 422 is "% Vwd", which does not reflect previously generated result password 413 of "% V$t". In the example, because the user provided a different response to Q2 than the expected response, when password generation rules 409 are applied, result password 422 is an incorrect password.

In one example, when password service 112 generates an incorrect password, because password service 112 only stores sets of questions, with indexes, for accounts, but not the responses or generated passwords, password service 112 may not be aware that a recreated password does not match an expected, previously generated password. The account provider requiring a user to enter a password to access an account may receive each password recreated by password service 112, determine whether the recreated password matches the expected password, and if the recreated password does not match the expected password, return an invalid response to the user interface, indicating that the password generated by password service 112 is incorrect. For example, if a user sets up an account password with an account provider set to the digits in result password 413, however during a subsequent login attempt to the account the user provides answer 420 to password service 112 and password service 112 generates result password 422, password service 112 may be unaware that the incorrect password is generated, but the account provider may reject result password 422.

Figure 5:
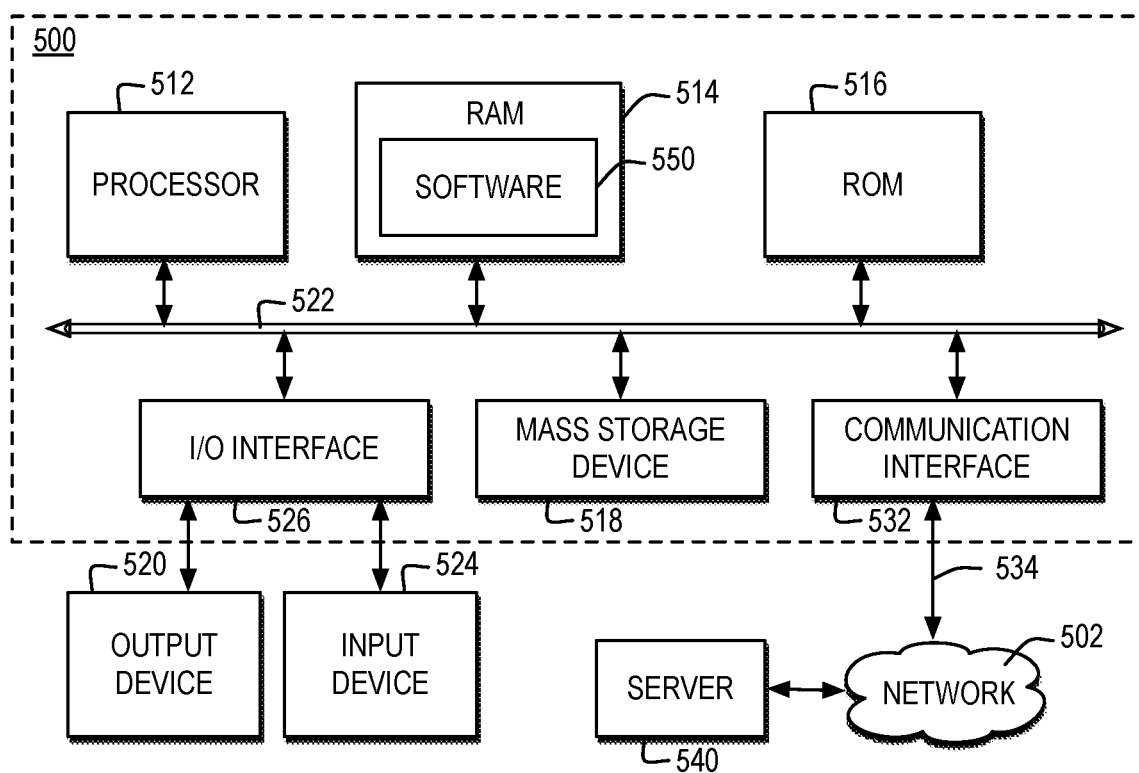
FIG. 5 illustrates a block diagram of one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power.

Processor 512 may be at least one general-purpose processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

Computer system 500 may communicate with a remote computer, such as server 540, or a remote client. In one example, server 540 may be connected to computer system 500 through any type of network, such as network 502, through a communication interface, such as network interface 532, or over a network link that may be connected, for example, to network 502.

In the example, multiple systems within a network environment may be communicatively connected via network 502, which is the medium used to provide communications links between various devices and computer systems communicatively connected. Network 502 may include permanent connections such as wire or fiber optics cables and temporary connections made through telephone connections and wireless transmission connections, for example, and may include routers, switches, gateways and other hardware to enable a communication channel between the systems connected via network 502. Network 502 may represent one or more of packet-switching based networks, telephony based networks, broadcast television networks, local area and wire area networks, public networks, and restricted networks.

Network 502 and the systems communicatively connected to computer 500 via network 502 may implement one or more layers of one or more types of network protocol stacks which may include one or more of a physical layer, a link layer, a network layer, a transport layer, a presentation layer, and an application layer. For example, network 502 may implement one or more of the Transmission Control Protocol/Internet Protocol (TCP/IP) protocol stack or an Open Systems Interconnection (OSI) protocol stack. In addition, for example, network 502 may represent the worldwide collection of networks and gateways that use the TCP/IP suite of protocols to communicate with one another. Network 502 may implement a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

In one embodiment, the operations performed by processor 512 may control the operations of flowchart of FIGS. 6-9 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts in FIGS. 6-9.

In addition, computer system 500 may include multiple peripheral components that facilitate input and output. These peripheral components are connected to multiple controllers, adapters, and expansion slots, such as input/output (I/O)

interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 5, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
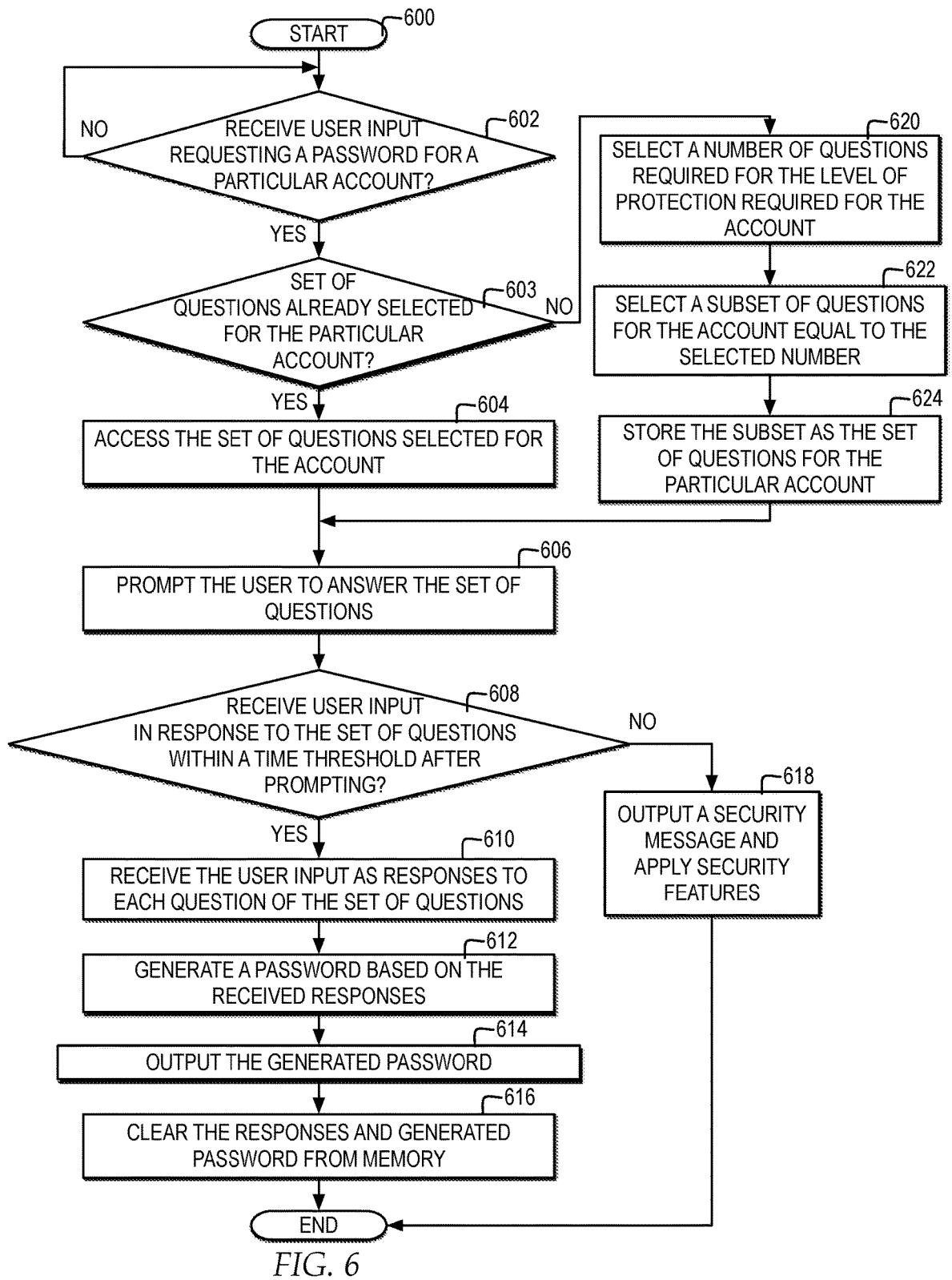
FIG. 6 illustrates one example of a high-level logic flowchart of a process and computer program for generating a password for at least one account.

FIG. 6 illustrates one example of a high-level logic flowchart of a process and computer program for generating a password for at least one account. In one example, a user of the at least one account may be in possession of or may have access to the computing device that is configured to perform the process and computer program illustrated in FIG. 6.

The process and computer program starts at block 600 and thereafter proceeds to block 602. Block 602 illustrates a determination whether a user input is received requesting a password for a particular account. At block 602, if a user input is received requesting a password for an account, then the process passes to block 603. Block 603 illustrates a determination whether a set of questions had already been selected for the particular account.

At block 603, if a set of questions has not already been selected for the particular account, then the process passes to block 620. Block 620 illustrates selecting a number of questions required for the level of protection required for the account. Next, block 622 illustrates selecting a subset of questions equal to the number of required questions. Thereafter, block 624 illustrates storing the subset as the set of questions for the particular account, and the process passes to block 606.

At block 603, if a set of questions has already been selected for the particular account, then the process passes to block 604. Block 604 illustrates accessing the set of questions selected for the account. Next, block 606 illustrates prompting the user to answer the set of questions. Thereafter, block 608 illustrates a determination whether user input is received in response to the set of questions within a time threshold after prompting. At block 608, if user input is not received in response to the set of questions within a time threshold after prompting, then the process passes to block 618. Block 618 illustrates outputting a security message and applying security features, and the process ends. Returning to block 608, if user input is received in response to the set of questions within the time threshold after prompting, then the process passes to block 610. Block 610 illustrates receiving the user input as responses to each question of the set of questions. Next, block 612 illustrates generating a password based on the received responses. Thereafter, block 614 illustrates outputting the generated password to the account. In one example, outputting the generated password to the account may include, but is not limited to, directly entering the password as an input to the account, copying the password into a local cache that the user can select to copy and paste into the account, and outputting the password into an interface that the user can select to apply to the account. In one example, the generated password output to the account is initially selected as the password required to enable authorized access to the secured application account, and for subsequent accesses, if the user enters the same answers to the set of questions, the generated password will match the required password to enable authorized access to the secured application account. Next, block 616 illustrates clearing the responses and generated password from memory, and the process ends.

Figure 7:
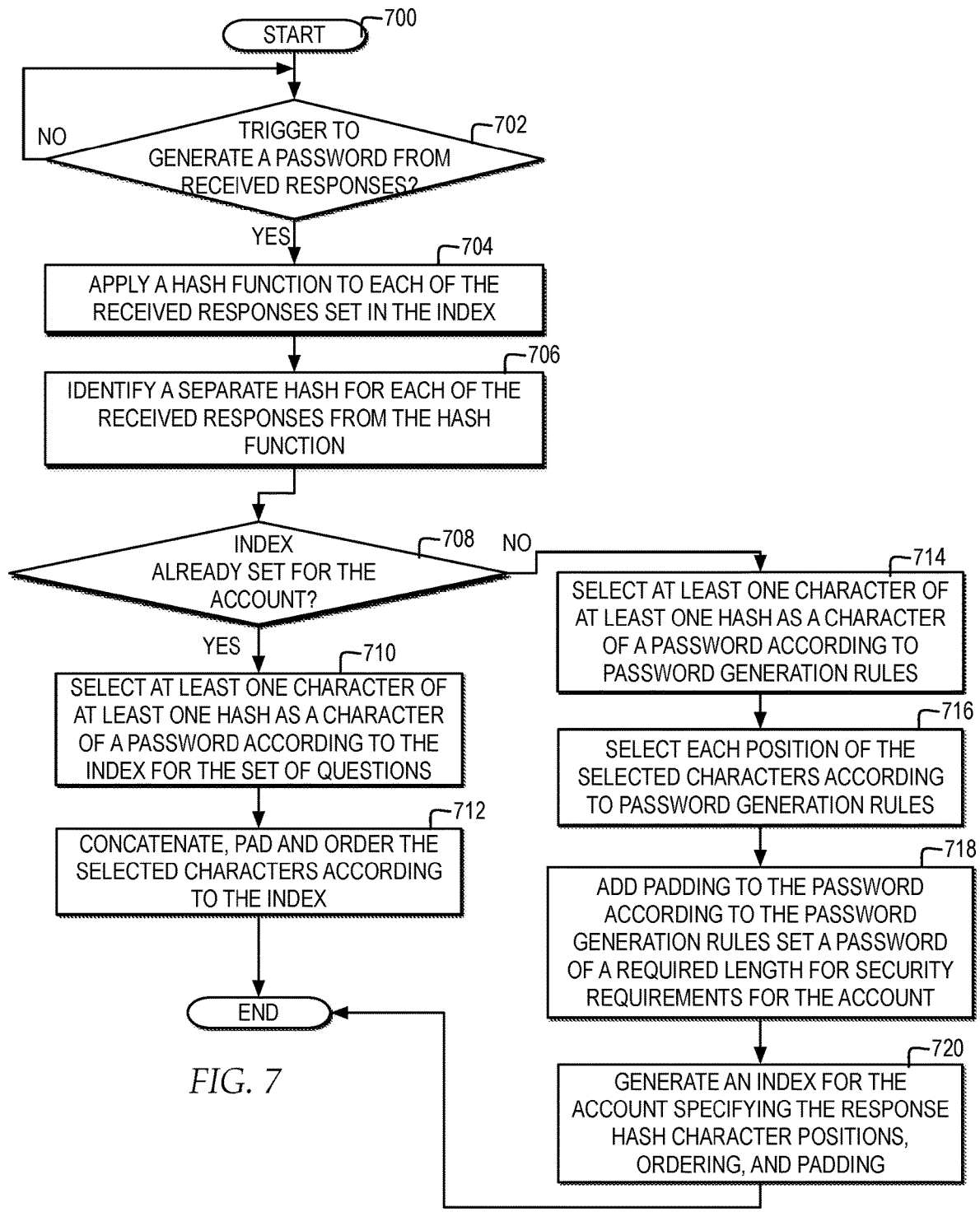
FIG. 7 illustrates one example of a high-level logic flowchart of a process and computer program for generating a password for at least one account from responses to questions.

FIG. 7 illustrates one example of a high-level logic flowchart of a process and computer program for generating a password for at least one account from responses to questions.

The process and computer program starts at block 700 and thereafter proceeds to block 702. Block 702 illustrates a determination whether there is a trigger to generate a password from received responses. In one example, block 612 may be the trigger to generate a password from received responses. At block 702, if there is a trigger to generate a password from the received responses, then the process passes to block 704. Block 704 illustrates applying a hash function to each of the received responses set in the index. Next, block 706 illustrates identifying a separate hash for each of the received responses from the hash function. Thereafter, block 708 illustrates a determination whether there is already an index set for the account.

At block 708, if an index is already set for the account, then the process passes to block 710. Block 710 illustrates selecting at least one character of at least one hash as a character of a password according to the index for the set of questions. Next, block 712 illustrates concatenating, padding, and ordering the selected characters according to the index, and the process ends.

Returning to block 708, if an index is not already set of the account, then the process passes to block 714. Block 714 illustrates selecting at least one character of at least one hash as a character of a password according to password generation rules for randomized selection. Next, block 716 illustrates selecting each position of the selected characters in the password according to password generation rules. Next, block 718 illustrates adding padding to the password according to the password generation rules to set a password of a required length for security requirements for the password. Thereafter, block 720 illustrates generating an index for the account specifying the response hash character positions, ordering, and padding, and the process ends.

FIG. 8 illustrates one example of a high-level logic flowchart of a process and computer program for modifying a set of questions for an account.

The process and computer program starts at block 800 and thereafter proceeds to block 802. Block 802 illustrates a determination whether a modification of a set of questions is triggered. At block 802, if a modification of a set of questions is triggered, then the process passes to block 803. Block 803 illustrates generating the password based on user responses to the current set of questions. Next, block 804 illustrates selecting a modified question for one of the current set of questions. Next, block 806 illustrates receiving user responses to the modified questions. Thereafter, block 808 illustrates applying a hash function to the received response to the modified question to recalculate the hash. Next, block 810 illustrates a determination whether the hash character in the modified hash matches the hash character for the current question in the password. At block 810 if the hash character in the modified hash matches the hash character for the current question in the password, then the process passes to block 812. Block 812 illustrates adjusting the index for the particular account to refer to the modified question according to the hash to maintain the same password for the particular account, and the process ends. Returning to block 810, at block 810 if the hash character in the modified hash does not match the hash character for the current question in the password, then the process passes to block 814. Block 814 illustrates discarding the modified question, and the process ends.

FIG. 9 illustrates one example of a high-level logic flowchart of a process and computer program for creating questions for users from which a set of questions may be selected for an account.

The process and computer program start at block 900 and thereafter proceed to block 902. Block 902 illustrates a determination whether an event is detected. In one example, a detecting device may detect an event. In another example, an event may be detected from a user selecting to enter a question. Next, block 904 illustrates a determination whether the event is assessed as relevant. At block 904, if the event is not assessed as relevant, then the process ends. At block 904, if the event is assessed at relevant, then the process passes to block 906. Block 906 illustrates adding the event to the event log. Next, block 908 illustrates generating at least one question based on the event according to one or more criteria. Thereafter, block 910 illustrates a determination whether the criteria requires a user confirmation of the question. At block 910, if the criteria does not require a user confirmation of the question, then the process passes to block 916. Block 916 illustrates storing the question with an event type identifier in a question database for one or more users, and the process ends.

Returning to block 910, at block 910, if the criteria requires a user confirmation of the question, then the process passes to block 912. Block 912 illustrates prompting the user to confirm the question generated from the event. Next, block 912 illustrates a determination whether the user confirms the question. At block 912, if the user does not confirm the question, then the process ends. At block 912, if the user confirms the question, then the process passes to block 914.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for generating a password, the method comprising:
    receiving, by a computer system, user input from a user for identifying a particular account from among a plurality of accounts;
    using, by the computer system, a detecting device for detecting an event related to user interaction with a physical location at a predefined time interval;
    generating, by the computer system, a plurality of questions based on the detected event;
    selecting, by the computer system, a set of questions specific for the particular account from among the plurality of questions;
    receiving, by the computer system, further user input comprising one or more received responses to each question of the set of questions;
    selecting, by the computer system, a portion of characters of only a selection of a plurality of response characters comprising the one or more received responses; and
    generating, by the computer system, a password for the particular account of a string of the portion of characters.

2. The method of claim 1, wherein generating, by the computer system, a password for the particular account of a string of the portion of characters further comprises:
    determining, by the computer system, a hash by applying a hash function to the one or more received responses of each question of the set of questions, wherein the password comprises at least part of the hash;
    generating, by the computer system, the password for the account based on the one or more received responses by selecting at least one hashed character from the at least one hash as one or more of the string of the portion of characters of a plurality of characters of the password; and
    associating, by the computer system, an ordered index of the set of questions from among the plurality of questions and a particular character position of each at least one hashed character within the at least one hash, for use in recreating the password.

3. The method of claim 2, wherein the method further comprises:
    modifying, by the computer system, the set of questions;
    recalculating, by the computer system, the hash; and
    adjusting, by the computer system, the ordered index for the modified set of questions and the recalculated at least one hash such that the resulting password remains the same.

4. The method of claim 3, wherein modifying, by the computer system, the set of questions further comprises:
    reformulating, by the computer system, the set of questions in a different language.

5. The method of claim 1, wherein selecting, by the computer system, a set of questions specific for the particular account from among the plurality of questions further comprises:
    determining, by the computer system, a level of protection required for the particular account;
    calculating, by the computer system, a number of questions of the set of questions from the level of protection;
    selecting, by the computer system, a subset of the set of questions for the particular account equal to the calculated number; and
    storing, by the computer system, the subset as the set of questions for the particular account.

6. The method of claim 1, wherein using, by the computer system, a detecting device for detecting an event related to user interaction with a physical location at a predefined time interval further comprises:

using, by the computer system, the detecting device for detecting the event at the predefined time interval, wherein the detecting device comprises one of a GPS receiver, NFC technology, an accelerometer, a gyroscope, a camera, a navigation application, a Wi-Fi card, and a Bluetooth card.

7. The method of claim 1, further comprising:

responsive to the detecting device detecting the event, determining, by the computer system, whether the event is relevant based on one or more criteria;

in response to determining the event is relevant, adding, by the computer system, the event to an event log;

generating, by the computer system, the plurality of questions based on the event in the event log according to the one or more criteria comprising one or more templates for inserting the information for the event into a question format;

in response to the one or more criteria requiring user confirmation of the plurality of questions, prompting, by the computer system, the user to confirm the plurality of questions generated from the event; and in response to the user confirming the plurality of questions generated from the event, storing, by the computer system, the plurality of questions with an event type identifier for the event in a question database for one or more users;

in response to the user selecting to delete a particular question of the plurality of questions, deleting, by the computer system, the particular question from the plurality of questions.

8. The method of claim 1, wherein using, by the computer system, a detecting device for detecting an event related to user interaction with a physical location at a predefined time interval further comprises:

detecting, by the computer system, an occurrence of one or more activities that occur using one or more computing devices of the user of the particular account.

9. The method of claim 1, wherein the method further comprises:

in response to prompting the user for responses to the set of questions, receiving, by the computer system, the further user input comprising the one or more received responses to each question of the set of questions, wherein the prompting comprises setting a predefined time limit for receiving the further user input.

10. The method of claim 1, wherein the method further comprises:

in response to the user requesting access to the particular account and selecting an input to trigger a password request interface to recreate the password, prompting, by the computer system, the user with the set of questions; and responsive to receiving one or more additional responses by the user to the set of questions, applying, by the computer system, one or more characters in the one or more additional responses to recreate the password, wherein the recreated password matches the password only if the one or more additional responses are the same as the one or more responses.

11. The method of claim 1, further comprising:

outputting, by the computer system, the password to a secured application for the account, wherein the password enables authorized access to the account through the secured application.

12. A computer program product for generating a password, the computer program product comprising a computer readable storage medium having program instructions embodied therewith, the program instructions executable by a computer to cause the computer to:

receive, by a computer, user input from a user for identifying a particular account from among a plurality of accounts;

use, by the computer, a detecting device for detecting an event related to user interaction with a physical location at a predefined time interval;

generate, by the computer, a plurality of questions based on the detected event;

select, by the computer, a set of questions specific for the particular account from among the plurality of questions;

receive, by the computer, further user input comprising one or more received responses to each question of the set of questions;

select, by the computer, a portion of characters of only a selection of a plurality of response characters comprising the one or more received responses; and generate, by the computer, a password for the particular account of a string of the portion of characters.

13. The computer program product of claim 12, further comprising the program instructions executable by the computer to cause the computer to:

determine, by the computer, a hash by applying a hash function to the one or more received responses of each question of the set of questions, wherein the password comprises at least part of the hash;

generate, by the computer, the password for the account based on the one or more received responses by selecting at least one hashed character from the at least one hash as one or more of the string of the portion of characters of a plurality of characters of the password; and associate, by the computer, an ordered index of the set of questions from among the plurality of questions and a particular character position of each at least one hashed character within the at least one hash, for use in recreating the password.

14. The computer program product of claim 12, further comprising the program instructions executable by the computer to cause the computer to:

determine, by the computer, a level of protection required for the particular account;

calculate, by the computer, a number of questions of the set of questions from the level of protection;

select, by the computer, a subset of the set of questions for the particular account equal to the calculated number; and store, by the computer, the subset as the set of questions for the particular account.

15. The computer program product of claim 12, further comprising the program instructions executable by the computer to cause the computer to:

use, by the computer, the detecting device for detecting the event at the predefined time interval, wherein the detecting device comprises one of a GPS receiver, NFC technology, an accelerometer, a gyroscope, a camera, a navigation application, a Wi-Fi card, and a Bluetooth card.

16. The computer program product of claim 12, further comprising the program instructions executable by the computer to cause the computer to:
responsive to the detecting device detecting the event, determine, by the computer, whether the event is relevant based on one or more criteria;
in response to determining the event is relevant, add, by the computer, the event to an event log;
generate, by the computer, the plurality of questions based on the event in the event log according to the one or more criteria comprising one or more templates for inserting the information for the event into a question format;
in response to the one or more criteria requiring user confirmation of the plurality of questions, prompt, by the computer, the user to confirm the plurality of questions generated from the event; and
in response to the user confirming the plurality of questions generated from the event, store, by the computer, the plurality of questions with an event type identifier for the event in a question database for one or more users;
in response to the user selecting to delete a particular question of the plurality of questions, delete, by the computer system, the particular question from the plurality of questions.

17. The computer program product of claim 12, further comprising the program instructions executable by the computer to cause the computer to:
detect, by the computer, an occurrence of one or more activities that occur using one or more computing devices of the user of the particular account.

18. The computer program product of claim 12, further comprising the program instructions executable by the computer to cause the computer to:
in response to prompting the user for responses to the set of questions, receive, by the computer, the further user input comprising the one or more received responses to each question of the set of questions, wherein the prompting comprises setting a predefined time limit for receiving the further user input.

19. A computer system for generating a password, comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to receive user input from a user for identifying a particular account from among a plurality of accounts;
program instructions to use a detecting device for detecting an event related to user interaction with a physical location at a predefined time interval;
program instructions to generate a plurality of questions based on the detected event;
program instructions to select a set of questions specific for the particular account from among the plurality of questions;
program instructions to receive further user input comprising one or more received responses to each question of the set of questions;
program instructions select a portion of characters of only a selection of a plurality of response characters comprising the one or more received responses; and
program instructions to generate a password for the particular account of a string of the portion of characters.

20. The computer system of claim 19, the stored program instructions further comprising:
program instructions to output the password to a secured application for the account, wherein the password enables authorized access to the account through the secured application.

* * * * *